United States Patent
Sebire et al.

(10) Patent No.: US 12,507,141 B2
(45) Date of Patent: Dec. 23, 2025

(54) CELL RESELECTION-RELATED INFORMATION ASSOCIATED WITH NETWORK SLICE OR CLOSED ACCESS GROUP FOR WIRELESS NETWORKS

(71) Applicant: Nokia Technologies Oy, Espoo (FI)

(72) Inventors: Benoist Pierre Sebire, Tokyo (JP); Gyorgy Tamas Wolfner, Budapest (HU); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/019,390

(22) PCT Filed: Aug. 2, 2021

(86) PCT No.: PCT/EP2021/071545
§ 371 (c)(1),
(2) Date: Feb. 2, 2023

(87) PCT Pub. No.: WO2022/029064
PCT Pub. Date: Feb. 10, 2022

(65) Prior Publication Data
US 2023/0276324 A1    Aug. 31, 2023

Related U.S. Application Data

(60) Provisional application No. 62/706,253, filed on Aug. 6, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0058* (2018.08); *H04W 36/0061* (2013.01)

(58) Field of Classification Search
CPC . H04W 36/08; H04W 36/32; H04W 36/0058; H04W 36/0085; H04W 36/0061;
(Continued)

(56) References Cited

U.S. PATENT DOCUMENTS

2018/0324602 A1    11/2018 Griot et al. .................. 16/32
2020/0120547 A1    4/2020 Han et al. .................. 36/11
(Continued)

FOREIGN PATENT DOCUMENTS

CN    108738096 A    11/2018
CN    109246775 A    1/2019
(Continued)

OTHER PUBLICATIONS

Zte et al., "Service based cell reselection in idle mode and inactive state," 3GPP TSG-RAN WG2 Meeting#101bis, R2-1804453, Sanya, China, Apr. 16-20, 2018.
(Continued)

*Primary Examiner* — Mohamed A Kamara
(74) *Attorney, Agent, or Firm* — McCarter & English, LLP

(57) ABSTRACT

A method may include receiving, by a user device from a network node of a wireless network, a cell reselection-related information associated with at least one of a network slice or a closed access group used by the user device; and performing, by the user device, a cell reselection based, at least in part, on the cell reselection-related information.

22 Claims, 7 Drawing Sheets

(58) Field of Classification Search
CPC ..... H04W 48/02; H04W 48/10; H04W 48/12;
H04W 48/18; H04W 48/14; H04W 48/16;
H04W 48/20; H04W 76/11; H04W 76/25;
H04W 60/00; H04W 60/04
See application file for complete search history.

(56) References Cited

U.S. PATENT DOCUMENTS

| | | | | |
|---|---|---|---|---|
| 2022/0167228 | A1* | 5/2022 | Li | H04W 76/11 |
| 2022/0418034 | A1* | 12/2022 | Jung | H04W 36/322 |
| 2023/0062362 | A1* | 3/2023 | Sun | H04W 36/34 |

FOREIGN PATENT DOCUMENTS

| | | |
|---|---|---|
| CN | 109842910 A | 6/2019 |
| CN | 111149387 A | 5/2020 |
| WO | WO2017140342 A1 | 8/2017 |

OTHER PUBLICATIONS

Nokia (Rapporteur), "Support for Non-Public Networks," 3GPP TSG-RAN WG2 Meeting #108, R2-1916637, Reno, USA, Nov. 18-22, 2019.
LC Electronics Inc., "Resolving miscellaneous open Issues," 3GPP TSG-RAN WG2 Meeting #109, R2-2001526, Feb. 24-Mar. 6, 2020.
Huawei et al., "Discussion on slice based cell reselection under network control," 3GPP TSG-RAN WG2 Meeting #114-e, May 19-27, 2021.

\* cited by examiner

CELL RESELECTION-RELATED INFORMATION ASSOCIATED WITH NETWORK SLICE OR CLOSED ACCESS GROUP FOR WIRELESS NETWORKS

CROSS REFERENCE TO RELATED APPLICATION

This patent application is a U.S. National Stage application of International Patent Application Number PCT/EP2021/071545 filed Aug. 2, 2021, which claims priority to U.S. Provisional Application No. 62/706,253 filed Aug. 6, 2020, which are hereby incorporated by reference in their entireties.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user device from a network node of a wireless network, a cell reselection-related information associated with at least one of a network slice or a closed access group used by the user device; and performing, by the user device, a cell reselection based, at least in part, on the cell reselection-related information.

According to another example embodiment, a method may include sending, by a network node in a wireless network, a cell reselection-related information associated with at least one of a network slice or a closed access group.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
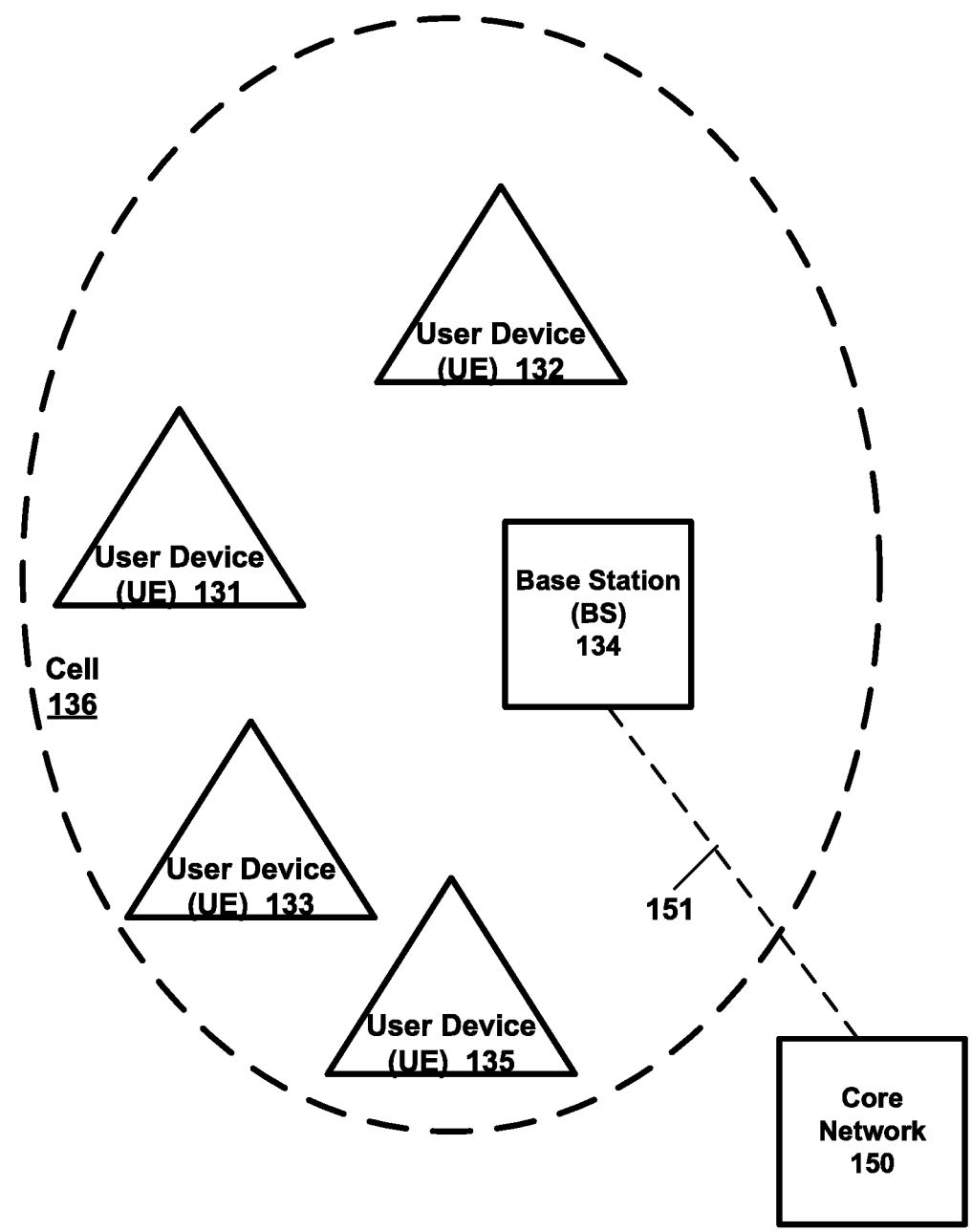
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a., a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a., a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

A UE (or user device) may be configured to communicate with nodes or network nodes of one or more different radio access technologies (RATs). A radio access technology (RAT) may be defined by a unique set of protocols (or protocol entities) that may define the operation of UEs or network nodes of that RAT. Different RATs may have different protocol entities. Thus, different RATs may include, for example, LTE, New Radio (5G), IEEE 802.11/WiFi, and others.

In a connected state (e.g., RRC-Connected) with respect to a cell (or gNB or DU), the UE is connected to a BS/gNB, and the UE may receive data, and may send data (e.g., based on receiving an uplink grant). Also, in a connected state or mode, UE mobility may be controlled by the gNB or network.

In order to conserve power, a UE may, for example, transition from a connected state (e.g., RRC_Connected) to an unconnected state, such as an Idle state (e.g., RRC_Idle) or Inactive state (e.g., RRC_Inactive), e.g., in which the UE may sleep (a low power state) much of the time while in Idle state or Inactive state. In Idle state or Inactive state, the UE does not have a connection established with any cell, and mobility (e.g., determining which cell the UE will be camped on or which cell to select as the serving cell for the UE) is controlled by the UE. While in Idle state or Inactive state, the UE may camp on a serving cell (the cell the UE is camped on), in which the UE may sleep much of the time, and then periodically wake (e.g., changing from a low power state to a full-power state) to perform one or more tasks or processes, e.g., such as receiving system information from the cell the UE is camped on (the serving cell), detecting a paging message from the serving cell (a paging message detected by the UE may indicate that the network has data for downlink transmission to the UE), and other operations. Thus, camping on a cell may include, e.g., a (idle or inactive state) UE waking at specific times or at predefined time intervals, and receiving system information (e.g., system information blocks or SIBs) from the serving cell, receiving paging messages from the serving cell (the cell the UE is camped on), and/or measuring a signal parameter(s) of a signal from the serving cell.

Initially, a UE may select a cell (e.g., a cell in the PLMN (public land mobile network)) to camp on. After camping on the cell, as noted, at various times after waking from a low power state, the UE monitors (receives) system information from the serving cell, detects paging messages from the serving cell, and may perform cell reselection. Cell reselection may include, e.g., the UE measuring signals of neighboring cell(s) based on measurement rules, and may select (reselect) a (e.g., better or stronger) cell to camp on based on cell reselection criteria and measured signals. Cell reselection criteria may indicate the criteria to select/reselect a cell as the serving cell (or to select the cell the UE will camp on). For example, cell reselection criteria may require (for a neighbor cell to be reselected as the serving cell (or selected to be camped on)), that a measured signal parameter(s) (e.g., such as reference signal received power (RSRP) and/or reference signal received quality (RSRQ)) of the neighbor cell be better or greater than a threshold(s), or better than a threshold+ an offset(s), or other cell reselection criteria. In some cases, a UE may not be required to measure signals from neighbor cells if the measured signal (e.g., RSRP and/or RSRQ) from the serving cell is good enough (e.g., RSRP and/or RSRQ of signal from serving cell is greater than a threshold), e.g., in order to conserve battery power. The UE may perform cell selection and/or cell reselection using cell reselection-related information (e.g., such as one or more cell reselection-related parameters), which, for example, may be received by the UE via the system information (SIBs) broadcast from the serving cell, or from one or more messages (e.g., such as a RRC Connection Release message) sent by the serving cell to the UE.

Thus, for example, cell reselection may include a procedure that the (e.g., idle or inactive state) UE may use to select/reselect a cell to be camped on (to select a cell to be a serving cell while the UE is in inactive or idle state). Cell reselection may include, e.g., measuring signal parameter(s) of the serving cell and/or measuring signal parameter(s) of one or more neighbor cells (cell measurements), evaluating a cell reselection criteria based on the measured signals and cell reselection-related information (or cell reselection-related parameters), and then determining if the cell reselection criteria has been met for a cell, and then camping on that cell if it meets the cell reselection criteria, and/or other functions that may be used to select or reselect a cell. Signal (or cell) measurement may include measuring a signal parameter (e.g., reference signal received power (RSRP) and/or reference signal received quality (RSRQ)) from its serving cell and/or from a neighbor cell.

An example cell reselection criteria may, e.g., require one or both of the following conditions to be met:
Squal>0, and/Srxlev>0, where:

$$Squal = Qqualmeas - Qqualmin > 0 \qquad (\text{Eqn. 1});$$

$$Srxlev = Qrxlevmeas - Qrxlevmin + QrxlevminOffset - Pcompensation > 0 \qquad (\text{Eqn. 2});$$

Where:
Qqualmeas is a measured signal quality of a neighbor cell (e.g., RSRQ);
Qrxlevmeas is a measured signal level or signal strength of the neighbor cell (e.g., RSRP);
Qqualmin is a minimum signal quality (which may be offset using one or more offsets);
Qrxlevmin is a minimum signal level or minimum signal power or signal strength (which may be offset by one or more offsets). One or more offsets (e.g., such as QrxlevminOffset, Pcompensation or other offset) may be added or included to adjust the reselection criteria indicated by Eqns. 1 and 2 for Squal and Srxlev. This is merely one illustrative example of a cell reselection criteria, and other cell reselection criteria(s) may be used. If the cell reselection criteria (e.g., in this example, Squal>0, and/Srxlev>0) are met for the neighbor cell (for example), then the inactive or idle state UE may (or will) reselect that neighbor cell to camp on.

In addition, either a network slice and/or a closed access group (CAG) may be used by a wireless network to provide a subset (or select set) of UEs or subscribers with access to a specific set of resources or services within a wireless network.

Network slicing is the separation of multiple virtual networks that operate on the same physical hardware (or physical network), for different applications, services or purposes. Said another way, network slicing may be or may include a network architecture that enables or provides multiplexing of virtualized and independent logical networks on the same physical network infrastructure. Each network slice may be an isolated end-to-end network tailored to fulfill diverse or unique requirements of a particular application. Thus, a network slice may be or may include a virtual network that operates on a shared physical network, to provide a specific service or performance for a set of UEs or for an application(s). A network slice may be or may be allocated a portion of network resources, which may include a portion of radio access network RAN (e.g., gNB) resources and a portion of core network (CN) resources. With network slicing, subscribers/UEs, or applications running on UEs, may belong to different groups, with each group or tenant type having different requirements (e.g., different maximum latency, minimum data rate, different types of security features, . . . , or other different service or performance requirements). Also, traffic (data packets or data) for different network slices may be handled by different protocol data unit (PDU) sessions. Different network slices may be associated with different UE applications, and/or different network slices may provide different resources or services that are directed to meeting requirements of different applications (e.g., browser application, email application, a self-driving car application, robotics application, utility meter reporting applications, . . . ). In some cases, some applications may be classified as an specific application type, such as URLLC, eMBB, IoT, or other type of application, e.g., where a network slice may be provided for each of these different application types. Different applications may have a wide variety of requirements for wireless resources or services. For example a browser application or email application may have very relaxed latency requirements, while a robotics application may require the ability to frequently transmit small data packets with very low latency.

Each network slice may be identified with a slice identifier, e.g., which may be a S-NSSAI (Single—Network Slice Selection Assistance Information). A S-NSSAI is may be used to uniquely identify a network slice. The S-NSSAI may include two components: the SST (Slice/Service Type) to identify the network slice type, and an optional SD (Slice Differentiator) to differentiate among different network slices of the same type. While a network or gNB may offer many (e.g., tens or hundreds) of different network slices, a UE may use up to N (e.g., 8) different network slices at a time, which may allow different applications running on the UE to use (or send and/or receive data) via a different network slice that may have different or differentiated network resources, network performance, and/or services that are provided to meet the requirements or needs of that application or that type of application. For example, different SST values (indicating different network slices) may be used or provided for different applications:

SST=1 for a network slice suitable for handling eMBB (mobile broadband applications;

SST=2 for a network slice suitable for handling ultra-reliable low latency communications (URLLC) applications; and SST=3 for a network slice suitable for handling Internet of Things (IoT) or massive IoT (MIot). Each these of network slices may offer specific features or services designed to meet the specific needs of these different types of applications.

For example, network slice 1 may be provided for Internet browsers and email applications (or lower performance requirements); network slice 2 may be provided for a self-driving car application; network slice 3 may be provided for a utility meter reporting application, etc. A network slice may be provided for one cell, or may be provided on a plurality of cells. Thus, in some cases, a UE may use a slice on a first cell, and then may continue to use that same network slice when the UE performs a cell reselection or a handover to the second cell, if that second cell offers that network slice.

For example, a UE may send a request to a cell or gNB to request use of one or more network slices (the UE requested network slices). The UE may or may not know what network slices are supported by the cell or gNB. The network may reply with information indicating the network slice(s) that the UE is permitted to use considering the network slices supported by the cell or gNB and subscription of the user.

In some cases, a closed access group may be used to limit access to a cell(s) to only a subset of UEs, or a specific group of UEs or users. For example, a non-public network may be a wireless network deployed for non-public use (e.g., such as a wireless network for a private use, for a private group, such as for a corporation or within a corporate campus, a robotics factory, for a government entity, etc., or other non-public use). Also, for example, a public network integrated-non-public network (PNI-NPN) may be a wireless network deployed or provided for non-public use which relies on one or more network functions provided by a public land mobile network. For example, in some cases, access to some wireless networks, such as NPNs, or PNI-NPNs, may be limited to a closed access group (CAG). A CAG may identify a group of UEs or subscribers which are permitted to access one or more CAG cells. A CAG may be identified by a CAG identifier that may be broadcast in system information (e.g., SIB1) by a gNB or cell. Thus, a gNB or cell may broadcast a CAG identifier of one or more CAGs to indicate (e.g., to CAG-capable UEs) which CAGs the gNB or cell supports or provides (or indicates that the cell is a CAG cell, for a particular CAG(s)). A CAG-capable UE may be configured (e.g., via a message or information transmitted by a gNB) with a list of one or more CAGs that the UE is allowed to access. For example, a UE may receive: 1) an allowed CAG list that includes the CAG identifier(s) of CAGs that the UE is allowed to access; and also possibly 2) a CAG-only indication if the UE is allowed to access wireless (e.g., 5G/new radio (NR)) services only via the allowed CAG list (or other list of CAGs) for the UE that indicate one or more CAGs that the UE is allowed to access. In a case where a UE receives or is configured with a CAG-only indication, such UE can access wireless services only via cells that support or are part of a closed access group of the indicated CAG identifier(s).

In some cases, a UE may be using (accessing wireless services via) a network slice and/or a CAG. For example, a UE may use both a network slice and a CAG (e.g., a UE may have an application that uses a network slice to obtain specific wireless network performance, while accessing services via a cell that provides or supports a CAG that the UE is configured to use). Or, in some cases, a UE may be using only one of those, e.g., either a network slice, or a CAG, for example. However, as noted, not all cells may support or provide the network slice and/or a CAG that the UE is using (or permitted to use). Also, as noted, in order to conserve battery power, a UE may transition to an idle or inactive state, where the UE may camp on a cell. When camping on a cell, the UE may, at various times, may wake from a low power state and may perform cell reselection, which may include the UE measuring signal parameter(s) of one or more neighbor cells (cell measurements), evaluating a cell reselection criteria for the neighbor cell based on the measured signals and cell reselection-related information, and then determining if the cell reselection criteria has been met for a cell, and then camping on that cell if it meets the cell reselection criteria.

It may be advantageous for the UE to camp on a cell that supports the network slice and/or CAG that the UE is using. But, not all cells may support the network slice(s) and/or CAG(s) that the UE is using. As a result, unnecessary battery consumption for the UE may occur if the UE needs or prefers to camp on a cell that supports the network slice or CAG that the UE is using, but the UE spends time measuring signal parameter(s) of a signal from cells that do not support the network slice or CAG that the UE is using. Also, in the event that a UE measures a signal parameters of signals from cells that do not support a network slice and/or CAG that is used by the UE, the evaluation of cell reselection criteria may result in a cell reselection to the cell that does not support the network slice or CAG that is used by the UE. Therefore, in order to reduce battery consumption during idle or inactive mode, and/or to improve the likelihood that a UE will perform cell reselection to a cell that supports a network slice and/or CAG that the UE is using, it may be desirable for the UE to perform signal measurements from (e.g., only from), or possibly at least prioritize signal measurements from, cells that support network slice(s) and/or CAG(s) that are used by the UE. It may also be desirable for the UE to adjust one (e.g., based on information from the network or serving cell) or more parameters of a cell reselection criteria for cells that support a network slice or CAG that is used by the UE, e.g., to make it more likely that the UE will perform a cell reselection to (or to favor) the cell that supports the network slice and/or CAG used by the UE.

Therefore, according to an example embodiment, a serving cell or network node (e.g., gNB) may transmit (e.g., broadcast or send one or more dedicated messages) a cell reselection-related information, which may include, e.g., information identifying one or more network slices and/or cell access groups (CAGs) that are supported by each of one or more other (e.g., neighbor or non-serving) cells, information (e.g., an offset, such as a network-slice specific offset or CAG-specific offset, or other cell reselection-related parameter) that may be used by the UE adjust a cell reselection criteria, or other cell reselection-related information. The cell reselection-related information may be associated with (e.g., may be indicated for) one or more network slices and/or CAGs and/or may be specified for each of one or more other cells.

For example, a UE (e.g., idle or inactive state UE) may receive the cell reselection-related information from a serving cell. The UE may perform cell reselection based (at least in part) on the cell reselection-related information, which may be associated with a network slice or CAG used by the UE. For example, the UE may measure signal parameter(s) of a signal from one or more cells that support a network slice and/or a CAG that is used by the UE. Or the UE may adjust a cell reselection criteria based on the cell reselection-related information, or may perform other action.

For example, the cell reselection-related information, transmitted or broadcast by a cell and received by the UE, may include a cell reselection-related parameter (such as a network slice-specific offset, or CAG-specific offset) associated with a network slice or CAG, and may be used by the UE to adjust a cell reselection criteria for the cell, and thereby make it more likely, for example, that the UE will perform cell reselection to a cell that supports a network slice or CAG that is used by the UE.

Also, for example, the cell reselection-related information may cause the UE to perform signal measurements, or to prioritize performing signal measurements, from cells or network nodes that support one or more network slices or CAGs that are used by the UE. For example, the network node (e.g., gNB) or cell may transmit (e.g., broadcast a signal or system information (such as a SIB) or transmit a dedicated message to a UE) cell reselection-related information, such as information identifying one or more network slices and/or CAGs that are supported by other (e.g., neighbour or non-serving) cells or network nodes/gNBs. For example, gNB1 providing cell 1, may broadcast or transmit cell reselection-related information that may indicate supported slices or CAGs of other (e.g., neighbor) cells, such as information indicating that: network slice 1, network slice 2, and CAG 1 are supported by cell 2 and gNB2, and information indicating that network slice 2, network slice 3, network slice 4 and CAG 2 are supported or provided by cell 3 or gNB3, etc. Thus, for each of one or more other (e.g., neighbor) cells, a cell or gNB may transmit or broadcast (e.g., via SIB or other transmission), network slice IDs (e.g., S-NSSAI or other slice identifiers) that identify one or more network slices that are supported by the neighbour cell, or CAG IDs that identify one or more CAGs that are supported by the other/neighbor cell. In this manner, a serving cell may broadcast or transmit information to an idle or inactive state UE that identifies network slices and/or CAGs that are supported by one or more other (e.g., neighbor) cells and/or other (or neighbor) gNBs. Therefore, based on this information, the idle or inactive state UE may determine which cells or gNBs support which network slices and/or CAGs. The UE is aware of which of one or more network slices and/or CAGs the UE is currently using. Thus, the UE, based on this example cell reselection-related information (network slice and/or CAG information) transmitted by the serving cell, may be able to determine which neighbor or non-serving cells or network nodes (e.g., gNBs) support the one or more network slices and/or CAGs that the UE is using (e.g., network slices that are being used by the UE and/or CAGs that the UE is accessing or is permitted to access). The UE may then adjust which cells it may measure, based on this cell reselection-related information. For example, the UE may then measure, or may prioritize measurement of, signal parameters of signals from cells that support the network slice(s) and/or CAG(s) that are used by the UE.

Thus, in some cases, as an illustrative example, the transmitted cell reselection-related information may be used by a network or network node (e.g., gNB) to impact, affect or adjust a likelihood that a UE may perform a cell reselection to a cell that may support a network slice or CAG that is used by the UE. Thus, for example, the use (transmission and/or reception) of cell reselection-related information (which may be for or associated with one or more network slices or CAGs) may allow a UE to (or make it more likely that the UE may) perform a cell reselection to, and then camp on, a cell that supports a network slice(s) and/or CAG(s) that is used by the UE. As noted, example cell reselection-related information may include information indicating network slices and/or CAGs that are supported by each of one or more cells, which may be used by the UE to select one or more cells to measure, e.g., to allow the UE to measure and/or prioritize measurement of cells that support a network slice and/or CAG that is used by the UE. Also, the cell reselection-related information may include, for example, one or more network slice or CAG-specific cell reselection-related parameters (e.g., network slice-specific offset(s)) that may be used by the UE to adjust a cell reselection criteria for a cell that supports the associated network slice or CAG.

Thus, for example, in order to conserve battery power, the UE may measure, or may prioritize (e.g., may perform first, or as a priority) the measurement of signal parameter(s) of signals received from cells or network nodes that support network slices and/or CAGs that are used by the UE, and the UE may not perform, and/or may delay, postpone or de-prioritize the measurement of signal parameter(s) of signals from cells that do not indicate or advertise that they support the network slices and/or CAG that are used by the UE. Thus, for example, in order to conserve battery power, the UE may selectively measure (or may prioritize measurement of) a signal parameter of signals received from cells or network node(s) that support one or more network slices or CAGs that are used by the UE.

Figure 2:
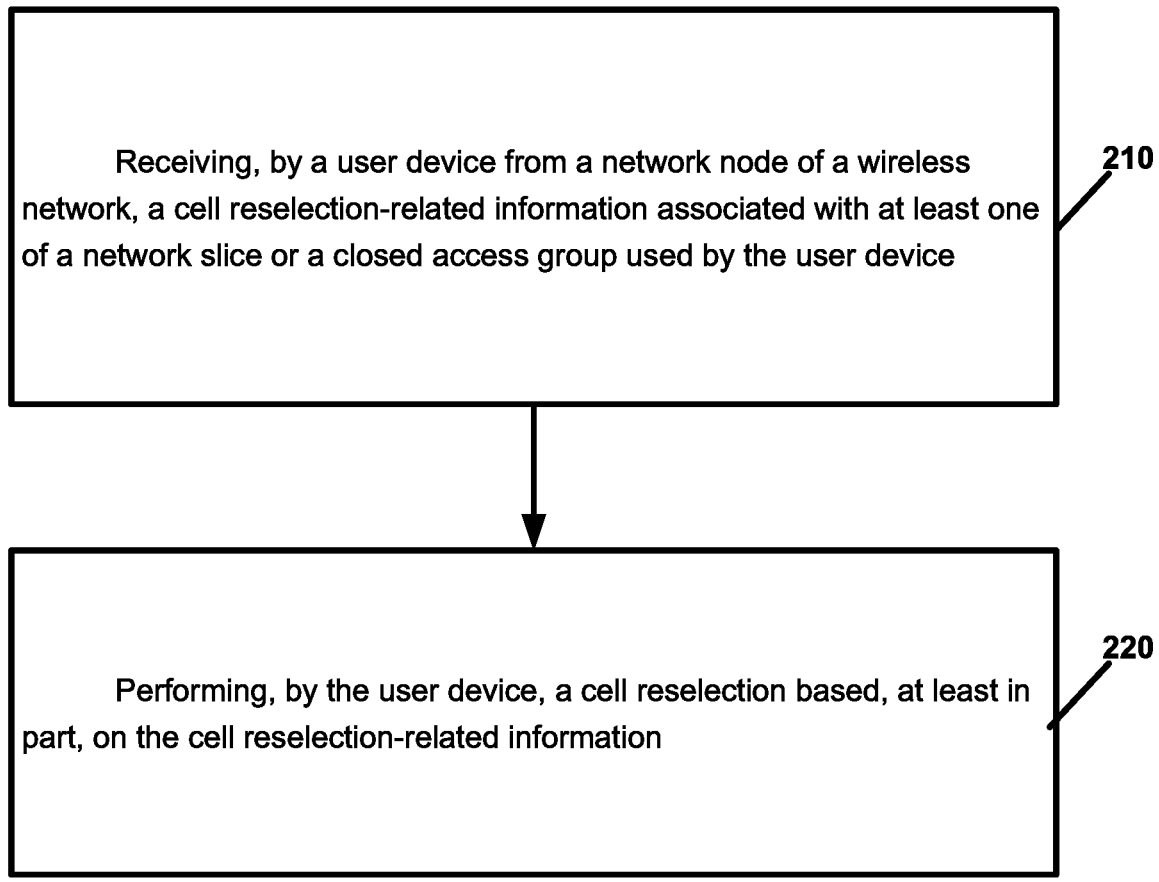
FIG. 2 is a flow chart illustrating operation of a user device (e.g., UE) according to an example embodiment.

FIG. 2 is a flow chart illustrating operation of a user device (e.g., UE) according to an example embodiment. Operation 210 may include receiving, by a user device (e.g., UE, such as an inactive or idle state UE) from a network node of a wireless network, a cell reselection-related information associated with at least one of a network slice or a closed access group (CAG) used by the user device. As an illustrative example, a UE may be using a network slice 1 (e.g., a UE may have an application running on the UE that may send and/or receive data via the network slice 1). As an example of receiving a cell reselection-related information (e.g., such as a cell reselection-related parameter), the UE may receive a network_slice1_offset via broadcast system information (e.g., SIB) or via a dedicated control message received from a cell or network node/gNB. For example, the network_slice1_offset may indicate an offset that should be added to, or used to adjust, the cell reselection criteria for any neighbor cell that provides network slice 1. See Eqn. 2A below for an example cell reselection criteria. Also, as another example of the UE/user device receiving cell reselection-related information, the UE may receive, for each of one or more other cells (e.g., neighbor or non-serving cells), information identifying one or more network slices and/or CAGs that are supported by the other/neighbor cell. This type of cell reselection-related information may allow the UE to be selective as to which cells the UE will measure a signal parameter from, e.g., so as to measure and/or prioritize measurement of, cells that support a network slice and/or CAG that is used by the UE. This may increase a likelihood that a cell reselection may be performed by the UE to a cell that supports a network slice or CAG that is used by the UE. information indicating one or more network slices and/or CAGs that the cell supports. Thus, based on this broadcast information, the UE may be able to measure signals of cells that support (or provide) network slices and/or CAGs the UE is using. These are merely some examples, and other cell reselection-related information may be used.

Operation 220 of FIG. 2 may include performing, by the user device (or UE), a cell reselection based, at least in part, on the cell reselection-related information (e.g., such as a cell reselection-related parameter). Cell reselection may include, e.g., one or more of: measuring signal parameter(s) of the serving cell and/or measuring signal parameter(s) of one or more other or neighbor cells (cell measurements), adjusting or determining a cell reselection criteria, evaluating a cell reselection criteria based on the measured signals and cell reselection-related information (e.g., which may include one or more cell reselection-related parameters, or other cell reselection-related information), and then determining if the cell reselection criteria has been met for a cell, and then camping on that cell if it meets the cell reselection criteria. A simple example cell reselection criteria may, e.g., require (for example) Srxlev>0, where:

$$Srxlev=Qrxlevmeas-Qrxlevmin+network\_slice1\_offset>0 \quad (Eqn.\ 2A)$$

Where:

Qrxlevmeas is a measured signal level or signal strength of the neighbor cell (e.g., measured RSRP of neighbor cell); network_slice1_offset may be a cell reselection-related information associated with network slice 1 (which may be received via broadcast SIB or dedicated messages from a cell or network node/gNB); and, Qrxlevmin is a minimum signal level or minimum signal power or signal strength (e.g., which may be offset or adjusted via use of offsets within Eqn. 2A). For example, the network_slice1_offset may be an example of a cell reselection-related information that is broadcasted by a cell or network node (e.g., gNB) to indicate an offset that should (or may) be added to, or used to adjust, the cell reselection criteria for any neighbor cell that provides network slice 1. In this manner, the UE may receive the network_slice1_offset via broadcast system information or a dedicated control message, determine that this cell reselection-related information relates to or is for (e.g., associated with) a network slice (e.g., network slice 1) used by the UE. The UE may measure a signal from a neighbor cell that supports network slice 1 (also referred to as network_slice1).

With respect to operation 220, for example, the UE may adjust the cell reselection criteria per Eqn. 2A, based on the received cell reselection-related information (network_slice1_offset). For example, the use of the received network_slice1_offset to adjust the cell reselection criteria of Eqn. 2A may favour (or make it more likely for) a cell reselection by the UE to that neighbor cell that provides or supports network slice 1. The UE may evaluate the adjusted cell reselection criteria, e.g., Eqn. 2A in this example (that may be adjusted based on the received network_slice1_offset), based on the measured signal parameter(s) of the neighbor cell and the received cell reselection-related information. Thus, the receipt and use of the cell reselection-related information (e.g., network_slice1_offset), associated with a network slice or CAG that may be used by the UE, may make it more likely (in this illustrative example) that the UE may or will perform a cell reselection to the neighbor cell that supports the network slice (e.g., network slice 1 in this example) or CAG that is used by the UE.

Alternatively, for example, operation 220 may include the UE measuring a signal parameter of one or more other/ neighbour cells, based on the cell reselection-related information (e.g., which may be information identifying a slice or CAG supported by one or more other cells). Thus, for example, at 220, the UE may perform, or may prioritize, measurement of signals from only those cells that support a network slice and/or CAG that is used by the UE.

Also, with respect to the method of FIG. 2, the receiving may include receiving, by the user device from a network node, the cell reselection-related information via either a broadcast signalling or a dedicated signalling transmitted to the user device.

Also, as noted, with respect to the method of FIG. 2, the operation 210 may include receiving, by the UE from the network node for one or more neighbor or non-serving cells, information identifying one or more network slices or closed access groups that are supported by the other (e.g., neighbour or non-serving) cell.

Also, with respect to the method of FIG. 2, the cell reselection-related information may include at least one of the following (as some illustrative examples of cell reselection-related information):

information identifying one or more network slices or closed access groups (CAGs) that are supported by each of one or more other cells;

an indication that a frequency or frequency band supports at least one of the network slice or the closed access group used by the UE/user device;

an indication that a frequency or frequency band does not support at least one of the network slice or the closed access group used by the UE;

an indication that one or more cells or a network node supports the network slice or is part of the closed access group used by the UE;

an indication that a radio access technology (RAT) supports at least one of the network slice or the closed access group used by the UE;

a parameter that is part of a cell reselection criteria that favours or prioritizes, for cell reselection, a cell that supports at least one of the network slice or the closed access group used by the UE over a cell that does not support the network slice or the closed access group used by the UE;

an offset, to be used by the UE as part of a cell reselection criteria, associated with the at least one of the network slice or the closed access group used by the UE;

a network slice-specific reference signal received power (RSRP)-offset or a reference signal received quality (RSRQ)-offset that is part of a cell reselection criteria;

a closed access group-specific reference signal received power (RSRP)-offset or a reference signal received quality (RSRQ)-offset that is part of a cell reselection criteria; or a slice-specific measurement rule or a CAG-specific measurement rule, specific to the at least one of the network slice or the closed access group used by the UE, that provides a rule or instructions for performing signal measurements as part of cell reselection.

Also, with respect to the method of FIG. 2, the receiving a cell reselection-related information may include, for example: receiving an offset (e.g., see example of network_slice1_offset, described above) associated with at least one of the network slice or the closed access group used by the user device; wherein the performing cell reselection may include: adjusting and/or evaluating, by the UE/user device, a cell reselection criteria based on at least the offset associated with at least one of the network slice or the closed access group used by the UE.

Also, with respect to the method of FIG. 2, the performing cell reselection may include (e.g., one or more of the following): measuring, by the UE (or user device), a signal parameter of a signal received from another (e.g., neighbour or non-serving) cell; adjusting and/or evaluating, by the UE, a cell reselection criteria based on at least the measured signal parameter and the cell reselection-related information associated with at least one of the network slice or the closed access group used by the UE; determining, by the UE, that the cell reselection criteria is met for the cell; and selecting, by the UE, the cell to camp on for which the cell reselection criteria is met.

Also, with respect to the method of FIG. 2, wherein the cell reselection-related information may include a plurality of cell reselection-related information including: 1) an indication that a frequency band supports at least one of the network slice or the closed access group used by the UE/user device, and 2) an offset associated with at least one of the network slice or the closed access group (CAG) used by the UE and to be used for evaluating a cell reselection criteria; wherein the performing cell reselection may include: measuring, by the UE/user device, a signal parameter of a signal received from a cell via the frequency band that supports at least one of the network slice or the closed access group used by the UE; and evaluating, by the UE, a cell reselection criteria for the cell based on at least the measured signal parameter of the cell and the offset.

Also, with respect to the method of FIG. 2, wherein the receiving a cell reselection-related information may include: receiving an indication that a frequency band supports at least one of the network slice or the closed access group used by the UE (or user device); and wherein the performing cell reselection comprises: measuring, by the UE, a signal parameter of signals received via the frequency band that is indicated as supporting at least one of the network slice or the closed access group that is used by the UE.

Also, with respect to the method of FIG. 2, the performing cell reselection may further include: evaluating, by the user device, a cell reselection criteria based on the measured signal parameter of the signals received via the frequency band (e.g., see the UE evaluation of cell reselection criteria of Eqn. 2A, based on received network_slice1_offset and measured signal parameter of a neighbor cell).

Figure 3:
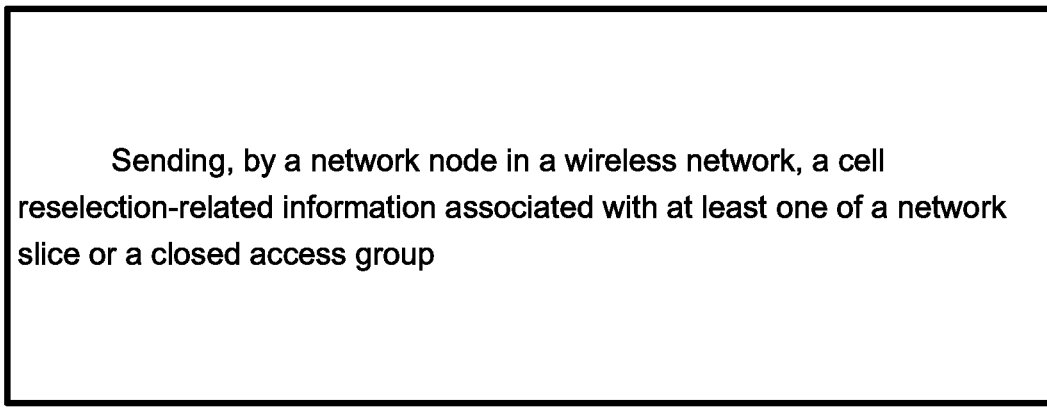
FIG. 3 is a flow chart illustrating operation of a network node (e.g., gNB, or BS, gNB-DU, or other network node).

FIG. 3 is a flow chart illustrating operation of a network node (e.g., gNB, or BS, gNB-DU, or other network node). Operation 310 includes sending, by a network node in a wireless network, a cell reselection-related information associated with at least one of a network slice or a closed access group. For example, the cell reselection-related information may be sent or transmitted by the network node via either a broadcast signalling or a dedicated signalling transmitted (e.g., which may be sent or transmitted to one or more UEs/user devices). The network node (e.g., gNB or cell) transmission of a cell reselection-related information may, for example, include transmission of a cell reselection-related parameter (e.g., such as network_slice1_offset for example) may allow a UE to receive such parameter and adjust a cell reselection criteria, e.g., per cell reselection criteria of Eqn. 2A, based on the received cell reselection-related information (e.g., based on network_slice1_offset, as an example). The UE may then evaluate such adjusted or updated cell reselection criteria, and perform cell reselection to a neighbor cell (e.g., to a cell that supports or provides a network slice or CAG used by the UE), if the cell reselection criteria is met or satisfied.

With respect to operation 310 of FIG. 3, the sending or transmission of a cell reselection related information may include, for example, for each of one or more other cells, information identifying one or more network slices and/or CAGs that are supported by the other/neighbor cell. This type of cell reselection-related information may allow the UE to be selective as to which cells the UE will measure a signal parameter from, e.g., so as to allow the UE to measure and/or prioritize measurement of, cells that support a particular network slice and/or CAG that is used by the UE.

With respect to operation 310 of FIG. 3, the sending may include, for example, sending, by the network node (e.g., gNB or cell) to at least a UE/user device, information identifying one or more network slices or closed access groups (CAGs) that are supported by a neighbouring (or other) cell.

The method of FIG. 3 may also include receiving, by the network node from a UE/user device, a request by the UE to use the network slice or the closed access group of one or more cells of the wireless network.

With respect to the method of FIG. 3, the cell reselection-related information may include at least one of the following (as illustrative examples of a cell reselection-related information): information identifying one or more network slices or closed access groups that are supported by each of one or more other (or neighbor) cells;

an indication that a frequency or frequency band supports at least one of the network slice or the closed access group;

an indication that a frequency or frequency band does not support at least one of the network slice or the closed access group;

an indication that one or more cells or a network node supports the network slice or is part of the closed access group;

an indication that a radio access technology (RAT) supports at least one of the network slice or the closed access group;

a parameter that is part of a cell reselection criteria that favours or prioritizes, for cell reselection, a cell that supports at least one of the network slice or the closed access group used by the UE/user device over a cell that does not support the network slice or the closed access group;

an offset, to be used by the UE/user device as part of a cell reselection criteria, associated with at least one of the at least one of the network slice or the closed access group;

a network slice-specific reference signal received power (RSRP)-offset or a reference signal received quality (RSRQ)-offset that is part of a cell reselection criteria;

a closed access group-specific reference signal received power (RSRP)-offset or a reference signal received quality (RSRQ)-offset that is part of a cell reselection criteria; or a network slice-specific measurement rule or a CAG-specific measurement rule, specific to the at least one of the network slice or the closed access group, that provides a rule or instructions for performing signal measurements as part of cell reselection.

With respect to the method of FIG. 3, the sending may include sending, by the network node, an offset associated with at least one of the network slice or the closed access group, for adjustment of a cell reselection criteria for a cell that supports the network slice or the closed access group. Or, the sending may include sending an indication that a frequency band supports at least one of the network slice or the closed access group.

Therefore, different cell re-selection parameters may be used for idle or inactive UEs, depending on the network slice(s) and/or CAG(s). A UE's use of a CAG may be determined or may be based on whether the UE accesses (or has access to, or is permitted to access) a CAG cell as a CAG member, for example. As example broadcast cell reselection-related information, an offset1 may be indicated (or identified within broadcast information) for network slice 1, an offset2 may be indicated for network slice 2, an offset3 may be indicated for CAG1, etc.

Thus, for example, the adjusted cell reselection-related information (which may be cell reselection-related information, such as cell reselection-related parameter(s), provided for UEs that generally use network slices or CAGs, or may be per-slice or per-CAG cell reselection-related information), or the per-slice or per CAG cell reselection-related information, may be transmitted via dedicated messages transmitted to a UE, or may be broadcast via system information (e.g., via system information blocks), such as via one or more of the following:

CAG and network slices are different techniques provide different network resources for different groups. Various SIBs or system information blocks may provide cell reselection-related information to UEs, such as, for example:

SIB2, which contains cell re-selection information common for intra-frequency, inter-frequency and/or inter-RAT cell re-selection;

SIB3, which contains neighboring cell related information relevant only for intra-frequency cell re-selection (where intra-frequency may mean or may include a same frequency or same frequency band as the frequency band that the UE is currently monitoring on the cell the UE is current camped on);

SIB4, which contains information relevant only for inter-frequency (a different frequency band than the UE is currently monitoring) cell re-selection, such as information about other NR/5G frequencies and inter-frequency neighboring cells relevant for cell re-selection;

SIB5, which contains information relevant only for inter-RAT (other radio access technologies) cell re-selection, e.g., information about E-UTRA frequencies and E-UTRAs neighboring cells relevant for cell re-selection.

Signalling, e.g., to provide cell reselection-related information, or other control information may be provided or transmitted to UEs to either overwrite one or more cell reselection-related information or parameters, inhibit them, or adjust them with a signalled coefficient. The additional signalling can either be done in a dedicated manner, in each of the SIBs above, or in a different SIB (new one or existing one).

The network signals (in current SIB, or a new SIB), may include cell reselection-related information or parameters transmitted as one or more of the following slice (re) selection information: information indicating that certain RATs (radio access technologies), or certain frequencies (or frequency bands), or certain cells support specific network slice(s) or CAG(s), such as, for example:

1) The UE may be notified, e.g., via configuration or via message or broadcast signalling, that RAT2 has cells that support network slices Y and Z used by the UE. Thus, the UE may perform measurement of signals from (cells of) RAT2, or may prioritize measurement of signals from cells of RAT2, over measurement of other RAT signals (e.g., from cells of RAT3) that do not support a network slice or CAG used by the UE.

2) Frequency (or frequency band) X supports slices Y and Z. If UE is using slice Y, then the UE may measure (or may prioritize, e.g., perform first, measurement of) signals from neighbor cells on that frequency that supports a slice or CAG used by the UE. Or, in some cases, the UE may only measure cells on these frequencies that support its slices/CAGs (slices/CAG used by the UE). By measuring signals from cells only on the frequency as the currently camped on cell (intra-frequency measurement), this measurement approach may conserve battery power for the UE, e.g., since cell signals may be measured on the same frequency without switching to other frequencies/frequency bands to perform signal measurements. Or, if the signal parameter of the current serving cell is inadequate (e.g., less than a threshold), then the UE may prioritize (e.g., first perform) the signal measurement of intra-frequency measurements from neighbor cells, which may conserve battery power of the UE, as noted. If current cell is not good, then UE may first measure signals from cells on frequency X as that is the best (or most efficient) use of battery power/time for cell measurements. The BS/gNB may broadcast different information, and UE can use different priorities based on which frequencies its slices are supported. E.g., may prioritize cell measurement on Frequency X (which has cells that support its network slices or CAGs). In addition to this approach of prioritizing (for measurement) certain frequencies or cells that provide specific network slice or CAG support, the network (BS or gNB) may also broadcast or indicate one or more adjusted cell reselection parameters like an offset (see below).

3) Cell 1 supports network slices 2, 3 and 4. UE may be using one or more of network slices 2, 3 and/or 4. Thus, the UE may perform only, or may prioritize, measurements on cells (such as cell 1) that supports one or more or even all of the network slices (or CAGs) that are used by the UE. This approach (this measurement, or prioritization of signal measurement from cells that supports the UE's slices or CAGs) may make it more likely that the UE will perform a cell reselection (if one of the measured cells satisfies the cell reselection criteria) to a cell that supports one or more (or even all) of the network slices or CAGs that are used by the UE.

Also, cell reselection-related information, e.g., such as cell reselection-related parameter(s), may be received by the UE for one or more network slices or CAGs, and may be used by the UE for manipulating adjusting cell (re)selection criteria (e.g., see Eqn. 2A, for example) so that RATs/

Frequencies/cells supporting certain slices/NPN "looks better" or is more attractive compared to RATs/Frequencies/cells not supporting certain slices (the UE may adjust its own cell reselection criterion, e.g., new offsets, to adjust cell measurements to prefer/prioritize measurements and cell reselection to cells that support its NW slices.

Alternatively, the UE measures only RATs/Frequencies/cells supporting certain slices.

4) Network slice-specific, or CAG-specific offsets (e.g., RSRP or RSRQ offsets) e.g., which may be used by the UE to adjust a cell reselection criteria of Eqn. 1 and/or Eqn. 2 that is used by the UE to perform cell reselection. For example, UE may receive (e.g., via broadcast signals or SIBs from a cell or gNB) network_slice1_offset to adjust the cell reselection criteria of Eqn. 2A, which may favour (or make it more likely for) a cell reselection by the UE to that neighbor cell that provides or supports network slice 1. The UE may evaluate the adjusted cell reselection criteria, e.g., Eqn. 2A in this example (that may be adjusted based on the received network_slice1_offset), based on the measured signal parameter(s) of the neighbor cell and the received cell reselection-related information (e.g., cell reselection-related parameter(s)). Thus, RSRP and/or RSRQ offsets may be indicated (in the cell reselection-related information broadcast by one or more gNBs) for one or more network slices and/or CAGs. Thus, the UE may then use or apply a cell reselection-related information (e.g., a cell reselection-related parameter), such as for a slice or CAG used by the UE, to adjust cell reselection criteria for cells that provide or support the indicates slices or CAGs.

5) Also different cell reselection-related information may be indicated for intra-frequency measurement (measurement of signals from cells on same frequency or frequency band that is used by currently serving cell to transmit system information or SIBs), inter-frequency measurement (measurement of signals from cells on a frequency or frequency band that is different from the frequency/frequency band used by currently serving cell to transmit system information or SIBs or cell reselection-related information such as cell reselection-related parameters), intra-RAT measurement (measurement of cells within same RAT as currently serving cell), and inter-RAT measurement (measurement of cells of a RAT that is different from RAT of currently serving cell).

6) Slice-specific, or CAG-specific cell reselection-related priority information, indicating a priority of a cell reselection of specific slices or CAGs. For example, this information may indicate that slice3 and slice4 are indicated as high priority. Thus, the UE, in response to this priority information, may measure signals from cells that support one or more of these high priority slices (e.g., slice3, slice4), and/or UE may measure and attempt to perform cell reselection to a cell that supports one or more of these indicated priority slices, as a priority (e.g., performed first); and/or measurement and/or performing (attempting to perform) cell reselection to cells that do not support the indicated high priority slices or CAGs would be performed as a lower priority (e.g., performed later, or performed only if there are no cells that support the high priority slices or CAGs, or performed after first measuring and attempting to perform cell reselection to a cell that supports a high priority slice or CAG).

7) Generally, slice-specific, and/or CAG-specific offsets, thresholds or other cell reselection-related information may be indicated or identified via SIBs or system information. The cell reselection-related information for a slice or CAG may be used by the UE to adjust an existing cell reselection criteria (e.g., see Eqn. 2A) for cells that support the indicated slice or CAG, or may be used to indicate or specify a new cell reselection criteria for cells that support the slice or CAG.

For example, the UE may use these new slice (or CAG)—specific (re)selection information (e.g., offsets or other slice or CAG-specific cell reselection-related information or cell reselection-related parameters) may be used for specific network slices (e.g., for specific network slices that may be used or to be requested by the UE); otherwise, the UE may use regular or default cell reselection-related information and/or regular or default cell reselection criteria (which is not specific for UEs that are using slices or CAGs, or which may not be slice-specific and/or CAG-specific, for example).

Thus, by using one or more of the various techniques described herein, signal measurement load for inactive or idle UEs may be reduced, e.g., such as for idle or inactive UEs that may be using one or more network slices or using (e.g., accessing) one or more CAGs/CAG cells. Thus, a UE may receive information (e.g., broadcast information) indicating that a cell(s) supports or provides a network slice or UE, which the UE may be using or accessing. (In general, the UE may also receive information indicating that a cell, frequency band and/or RAT supports a specific network slice or CAG.) The UE may then measure only, or may prioritize measurement of, signals from the cells that are indicated as supporting specific network slice(s) or specific CAGs. Thus, the UE may avoid, for example, measuring signals from cells which do not support or provide network slices or CAGs that are used or accessed by the UE, and which the UE would like to continue to use or access such slice(s) or CAG(s) after a cell reselection. Also, the UE may receive network slice-specific cell reselection-related information (e.g., offsets or other parameters) that may be used to adjust a cell reselection criteria for a cell that supports or provides a specific slice or CAG (e.g., a slice or CAG that is used or accessed by the UE). In this manner, measurement and/or cell reselection behavior of UEs may be impacted or adjusted to allow for conserving of UE battery power and/or allowing cell reselection to cells that may allow use of slices and/or access to a CAG at a cell after cell reselection.

Figure 4:
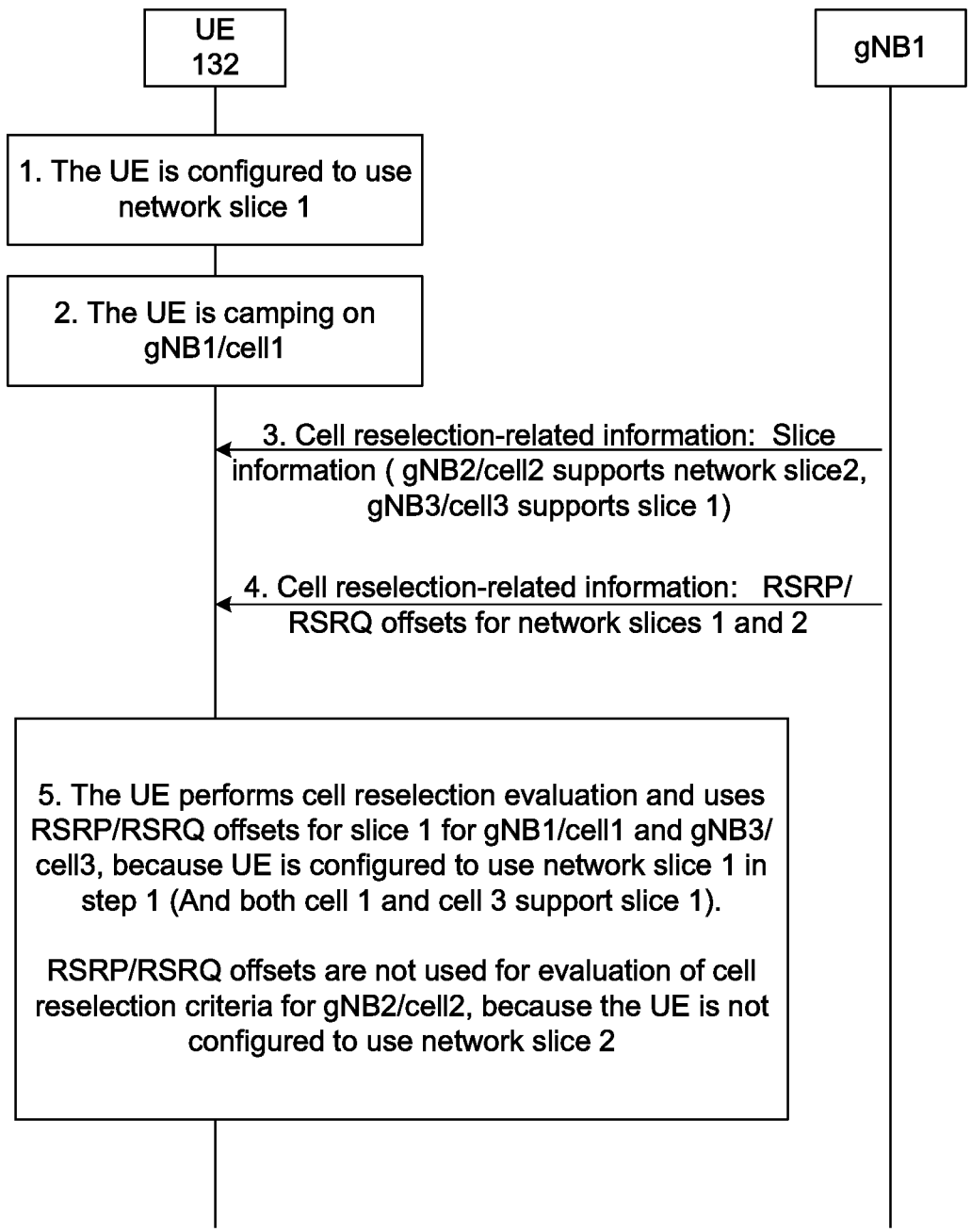
FIG. 4 is a diagram illustrating cell reselection performed by a user device or UE based on example cell reselection-related information according to an example embodiment.
Figure 5:
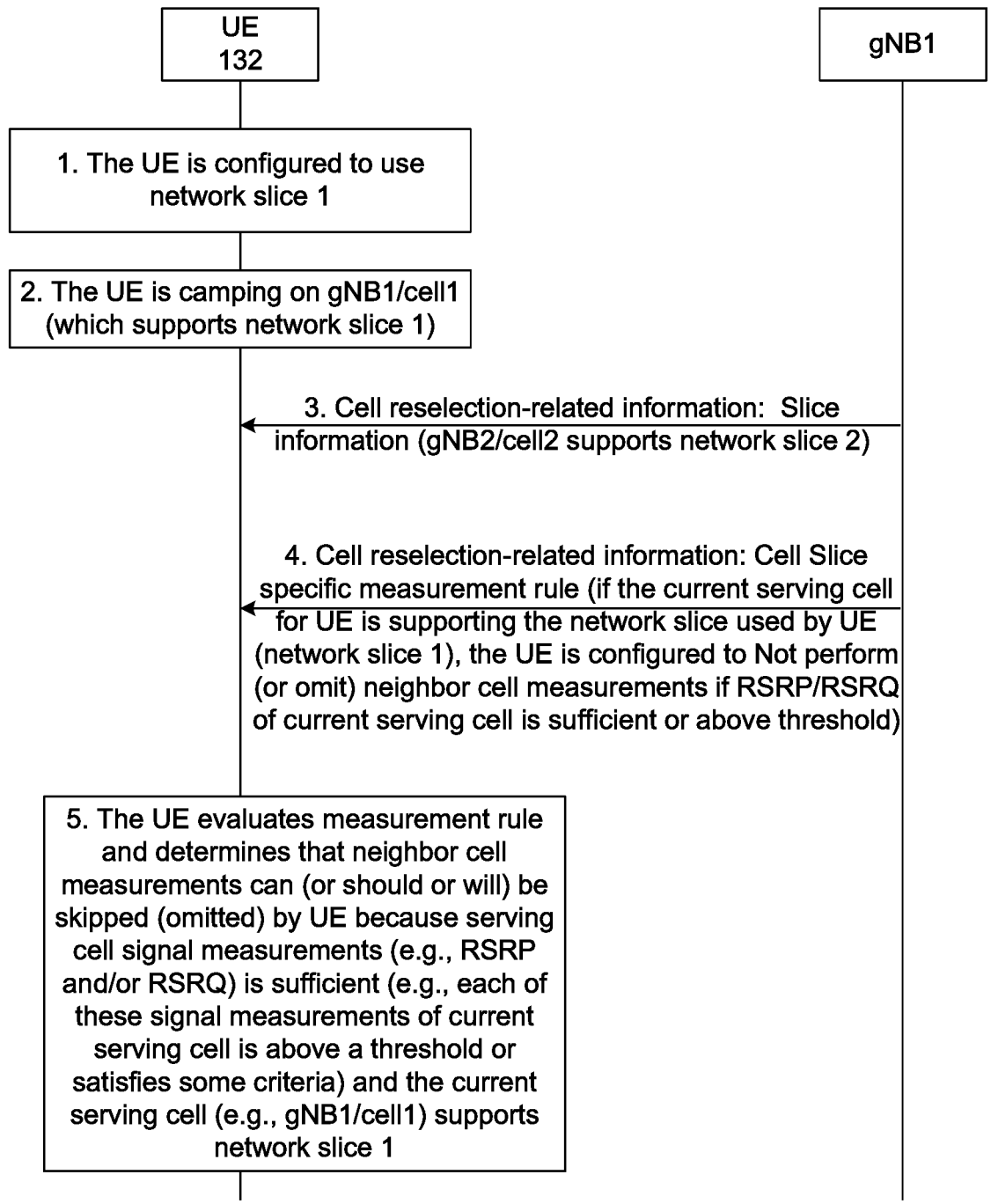
FIG. 5 is a diagram illustrating cell reselection performed by a user device or UE based on example cell reselection-related information according to another example embodiment.
Figure 6:
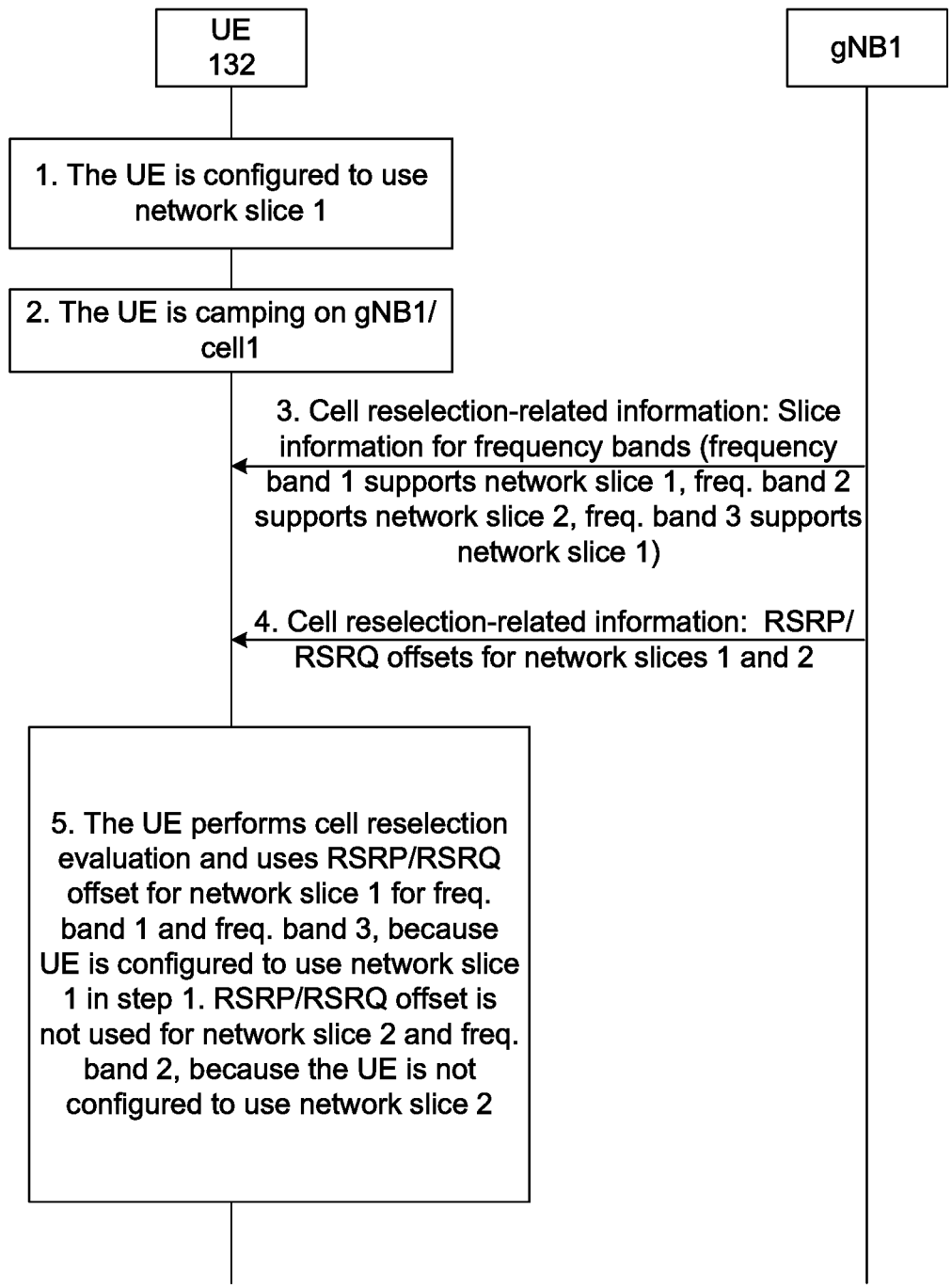
FIG. 6 a diagram illustrating cell reselection performed by a user device or UE based on example cell reselection-related information according to yet another example embodiment.

Network slices are used in the examples of FIGS. 4-6, but CAGs may be used instead, or in addition to network slices.

FIG. 4 is a diagram illustrating cell reselection performed by a user device or UE based on example cell reselection-related information according to an example embodiment. In this example, gNB1 provides cell 1 (e.g., the serving cell for the UE 132), gNB2 provides cell2, and gNB3 provides cell3. Cell 2 and cell 3 are neighbor/non-serving cells (other cells). A UE 132 may be camping on a cell 1 that is provided by gNB1 (an example of a network node). At 1), the UE is configured to use network slice 1, e.g., via sending a request to use slice 1, and/or by receiving a response (or confirmation message) and/or receiving a configuration message that configures the UE 132 to use network slice 1. At 2), the UE is camping on cell 1 that is provided by gNB1 (thus, the UE is camping on gNB1/cell1). Thus, gNB1 and cell 1 is the currently serving cell for the UE 132, which may be in Idle or Inactive state. At 3) and 4) the UE 132 may receive (e.g., broadcast via SIBs, or via dedicated message(s)) cell reselection-related information. At 3), the UE may receive (as some example cell reselection-related information) slice information indicating that gNB2 and cell2 supports network slice 2, gNB3 and cell3 supports network slice 1. This information may be received from the current serving cell (gNB1/cell1). At 4), the UE receives (as some example cell reselection-related information) receive power (e.g., RSRP) and/or receive quality (e.g., RSRQ) offsets for each of network slice 1 and network slice 2. These network slices may be used by UEs to adjust cell reselection criteria (e.g., see Eqn. 2A as an example where a cell reselection criteria was adjusted based on a received offset for or associated with a network slice). Among offsets (or cell reselection-related information) transmitted for different network slices (e.g., for slice 1, slice 2, slice 3, . . . ), the UE 132 may detect the RSRP/RSRQ offsets for network slice 1, e.g., because the UE is using network slice 1, and because the UE may be interested in continuing to use network slice 1 after any cell reselection, and the offsets for network slice 1 may be used for cell reselection for cells that support network slice 1, for example. At 5), the UE performs cell reselection evaluation (or evaluation of cell selection criteria (e.g., see Eqn. 2A as an illustrative example) for network slice 1 (e.g., using signal measurement from cell 3, which supports slice 1), because the UE 132 is configured to use network slice 1. Also, RSRP/RSRQ offsets (for network slice 2) are not used by UE 132 to evaluate a cell reselection criteria for gNB2/cell2 because the UE is not configured to use network slice 2. Steps 1) and 2) of FIG. 4 may be the same for FIGS. 5-6.

FIG. 5 is a diagram illustrating cell reselection performed by a user device or UE based on example cell reselection-related information according to another example embodiment. In this example, gNB1 provides cell 1, and gNB2 provides cell2. At 1), the UE is configured to use network slice 1. At 2), the UE is camping on gNB1/cell1 (gNB1 and cell 1 is the currently serving cell for the UE 132, which may be in Idle or Inactive state). At 3) and 4) the UE receives cell reselection-related information. At 3), the UE receives slice information, including information indicating the gNB2/cell2 supports network slice 2. At 4), the UE 132 receives cell slice specific measurement rule(s) indicating that if the current serving cell (e.g., cell 1 in this case) for the UE 132 is supporting the network slice (network slice 1 in this example) used by UE 132, the UE 132 is configured to Not perform (or should omit) measurement of signal parameters of signals from neighbor cells if the measured receive power and/or receive quality (e.g., RSRP, RSRQ) of the currently serving cell is above a threshold. At 5), the UE evaluates the measurement rule (UE determining that the RSRP and/or RSRQ are above thresholds, and thus sufficient), and determines that neighbor cell measurements can (or should or will) be omitted or skipped by the UE for this time period because the currently serving cell RSRP/RSRQ measured by UE 132 is sufficient or above a threshold(s), and the current serving cell (gNB1/cell1) supports network slice 1 used by UE 132. Thus, in this manner, according to this received cell slice specific measurement rule, the UE may omit neighbor cell measurements if the current serving cell is of sufficient (above a threshold) value and the current serving cell supports the network slice used by the UE 132.

FIG. 6 is a diagram illustrating cell reselection performed by a user device or UE based on example cell reselection-related information according to yet another example embodiment. Operations 1) and 2) of FIG. 6 is the same as in FIGS. 4-5. UE 132 uses network slice 1. At 3) and 4), the UE 132 receives cell reselection-related information. At 3), the UE receives slice information for frequency bands, e.g., indicating what network slices are supported by each of one or more frequency bands, such as indicating that frequency band 1 supports network slice 1, frequency band 2 supports network slice 2, and frequency band 3 supports network slice 1. At 4), UE 132 receives offsets (e.g., RSRP/RSRQ offsets) for network slice 1 and network slice 2. At 5), the UE perform evaluation of cell reselection criteria (e.g., see Eqns. 1, 2, 2A as examples of cell reselection criteria) and uses RSRP/RSRQ offsets for network slice 1 for signals measured via frequency band 1 and via frequency band 3. Thus, cell reselection criteria are adjusted by the UE based on the received offsets for network slice 1 for cell signals measured on frequency band 1 and/or measured on frequency band 3 (since the UE is using network slice 1). Offsets (e.g., RSRP/RSRQ offsets) for network slice 2 are not used for cell reselection (or to adjust a cell reselection criteria) because the UE is not using network slice 2.

EXAMPLE 1

A method comprising: receiving, by a user device from a network node of a wireless network, a cell reselection-related information associated with at least one of a network slice or a closed access group used by the user device; and performing, by the user device, a cell reselection based, at least in part, on the cell reselection-related information.

EXAMPLE 2

The method of Example 1, wherein the receiving comprises receiving, by the user device from the network node, a cell reselection-related information associated with each of a plurality of network slices or closed access groups; the method further comprising selecting a cell reselection-related information, among the received cell reselection-related information, that is associated with a network slice or closed access group used by the user device; and wherein the performing comprises performing a cell reselection based, at least in part, on the selected cell reselection-related information that is associated with a network slice or closed access group used by the user device.

EXAMPLE 3

The method of any of Examples 1-2 wherein the receiving a cell reselection-related information comprises: receiving, by the user device from a network node, the cell reselection-related information via either a broadcast signalling or a dedicated signalling transmitted to the user device.

EXAMPLE 4

The method of any of Examples 1-3, wherein the receiving a cell reselection-related information comprises: receiving, by the user device from the network node for a cell, information identifying one or more network slices or closed access groups that are supported by other cell(s); and wherein the performing cell reselection comprises: measuring, by the user device based on the received information, a signal parameter of a signal for a cell that supports a network slice or closed access group used by the user device.

EXAMPLE 5

The method of any of Examples 1-4, wherein the user device is a user device that is in an inactive state or idle state.

EXAMPLE 6

The method of any of Examples 1-5 wherein the cell reselection-related information comprises at least one of the following: information identifying one or more network slices or closed access groups that are supported by each of one or more other cells; an indication that a frequency or frequency band supports at least one of the network slice or the closed access group used by the user device; an indication that a frequency or frequency band does not support at least one of the network slice or the closed access group used by the user device; an indication that one or more cells or a network node supports the network slice or is part of the closed access group used by the user device; an indication that a radio access technology (RAT) supports at least one of the network slice or the closed access group used by the user device; a parameter that is part of a cell reselection criteria that favors or prioritizes, for cell reselection, a cell that supports at least one of the network slice or the closed access group used by the user device over a cell that does not support the network slice or the closed access group used by the user device; an offset, to be used by the user device as part of a cell reselection criteria, associated with the at least one of the network slice or the closed access group used by the user device; a network slice-specific reference signal received power (RSRP)-offset or a reference signal received quality (RSRQ)-offset that is part of a cell reselection criteria; a closed access group-specific reference signal received power (RSRP)-offset or a reference signal received quality (RSRQ)-offset that is part of a cell reselection criteria; or a slice-specific measurement rule or a CAG-specific measurement rule, specific to the at least one of the network slice or the closed access group used by the user device, that provides a rule or instructions for performing signal measurements as part of cell reselection.

EXAMPLE 7

The method of any of Examples 1-6: wherein the receiving a cell reselection-related information comprises: receiving an offset associated with at least one of the network slice or the closed access group used by the user device; wherein the performing cell reselection comprises: evaluating, by the user device, a cell reselection criteria based on at least the offset associated with at least one of the network slice or the closed access group used by the user device.

EXAMPLE 8

The method of any of Examples 1-7, wherein the performing cell reselection comprises: measuring, by the user device, a signal parameter of a signal received from a non-serving cell; evaluating, by the user device, a cell reselection criteria based on at least the measured signal parameter and the cell reselection-related information associated with at least one of the network slice or the closed access group used by the user device; and determining, by the user device, that the cell reselection criteria is met for the non-serving cell; selecting, by the user device, the non-serving cell to camp on for which the cell reselection criteria is met.

EXAMPLE 9

The method of any of Examples 1-8: wherein the cell reselection-related information comprises a plurality of cell reselection-related information including: 1) an indication that a frequency band supports at least one of the network slice or the closed access group used by the user device, and 2) an offset associated with at least one of the network slice or the closed access group used by the user device and to be used for evaluating a cell reselection criteria; wherein the performing cell reselection comprises: measuring, by the user device, a signal parameter of a signal received from a cell via the frequency band that supports at least one of the network slice or the closed access group used by the user device; and evaluating, by the user device, a cell reselection criteria for the cell based on at least the measured signal parameter of the cell and the offset.

EXAMPLE 10

The method of any of Examples 1-9: wherein the receiving a cell reselection-related information comprises: receiving an indication that a frequency band supports at least one of the network slice or the closed access group used by the user device; and wherein the performing cell reselection comprises: measuring, by the user device, a signal parameter of signals received via the frequency band that is indicated as supporting at least one of the network slice or the closed access group that is used by the user device.

EXAMPLE 11

The method of Example 10, wherein the performing cell reselection further comprises: evaluating, by the user device, a cell reselection criteria based on the measured signal parameter of the signals received via the frequency band.

EXAMPLE 12

A non-transitory computer-readable storage medium comprising instructions stored thereon that, when executed by at least one processor, are configured to cause a computing system to perform the method of any of Examples 1-11.

EXAMPLE 13

An apparatus comprising means for performing the method of any of Examples 1-11.

EXAMPLE 14

An apparatus comprising: at least one processor; and at least one memory including computer program code; the at least one memory and the computer program code configured to, with the at least one processor, cause the apparatus at least to perform the method of any of Examples 1-11.

EXAMPLE 15

A method comprising: sending, by a network node in a wireless network, a cell reselection-related information associated with at least one of a network slice or a closed access group.

EXAMPLE 16

The method of Example 15 wherein the sending comprises:
sending, by the network node, the cell reselection-related information via either a broadcast signalling or a dedicated signalling transmitted to a user device.

EXAMPLE 17

The method of any of Examples 15-16, wherein the sending comprises: sending, by the network node in a wireless network, the cell reselection-related information associated with at least one of a network slice or a closed access group used by a user device, wherein the cell reselection-related information is for use or adjustment, by one or more user devices, of a cell reselection criteria.

EXAMPLE 18

The method of any of Examples 15-17, wherein the sending a cell reselection-related information comprises: broadcasting, by the network node, system information including the cell reselection-related information associated with at least one of the network slice or the closed access group, wherein the cell reselection-related information is for use or adjustment of a cell reselection criteria.

EXAMPLE 19

The method of any of Examples 15-18, wherein the sending a cell reselection-related information comprises: sending, by the network node to at least a user device, information identifying one or more network slices or closed access groups that are supported by other cell(s).

EXAMPLE 20

The method of any of Examples 15-19, comprising:
receiving, by the network node from a user device, a request by the user device to use the network slice or the closed access group of one or more cells of the wireless network.

EXAMPLE 21

The method of any of Examples 15-20, wherein the user device is a user device that is in an inactive state or idle state.

EXAMPLE 22

The method of any of Examples 15-21 wherein the cell reselection-related information comprises at least one of the following: information identifying one or more network slices or closed access groups that are supported by each of one or more other cells; an indication that a frequency or frequency band supports at least one of the network slice or the closed access group; an indication that a frequency or frequency band does not support at least one of the network slice or the closed access group; an indication that one or more cells or a network node supports the network slice or is part of the closed access group; an indication that a radio access technology (RAT) supports at least one of the network slice or the closed access group; a parameter that is part of a cell reselection criteria that favors or prioritizes (or makes cell reselection more likely), for cell reselection, a cell that supports at least one of the network slice or the closed access group used by the user device over a cell that does not support the network slice or the closed access group; an offset, to be used by the user device as part of a cell reselection criteria, associated with at least one of the at least one of the network slice or the closed access group; a network slice-specific reference signal received power (RSRP)-offset or a reference signal received quality (RSRQ)-offset that is part of a cell reselection criteria; a closed access group-specific reference signal received power (RSRP)-offset or a reference signal received quality (RSRQ)-offset that is part of a cell reselection criteria; or a network slice-specific measurement rule or a CAG-specific measurement rule, specific to the at least one of the network slice or the closed access group, that provides a rule or instructions for performing signal measurements as part of cell reselection.

EXAMPLE 23

The method of any of Examples 15-22, wherein the sending a cell reselection-related information comprises: sending, by the network node, an offset associated with at least one of the network slice or the closed access group, for adjustment of a cell reselection criteria for a cell that supports the network slice or the closed access group.

EXAMPLE 24

The method of any of Examples 15-23, wherein the sending a cell reselection-related information comprises: sending an indication that a frequency band supports at least one of the network slice or the closed access group.

EXAMPLE 25

A non-transitory computer-readable storage medium comprising instructions stored thereon that, when executed by at least one processor, are configured to cause a computing system to perform the method of any of Examples 15-24.

EXAMPLE 26

An apparatus comprising means for performing the method of any of Examples 15-24.

EXAMPLE 27

An apparatus comprising: at least one processor; and at least one memory including computer program code; the at least one memory and the computer program code configured to, with the at least one processor, cause the apparatus at least to perform the method of any of Examples 15-24.

Figure 7:
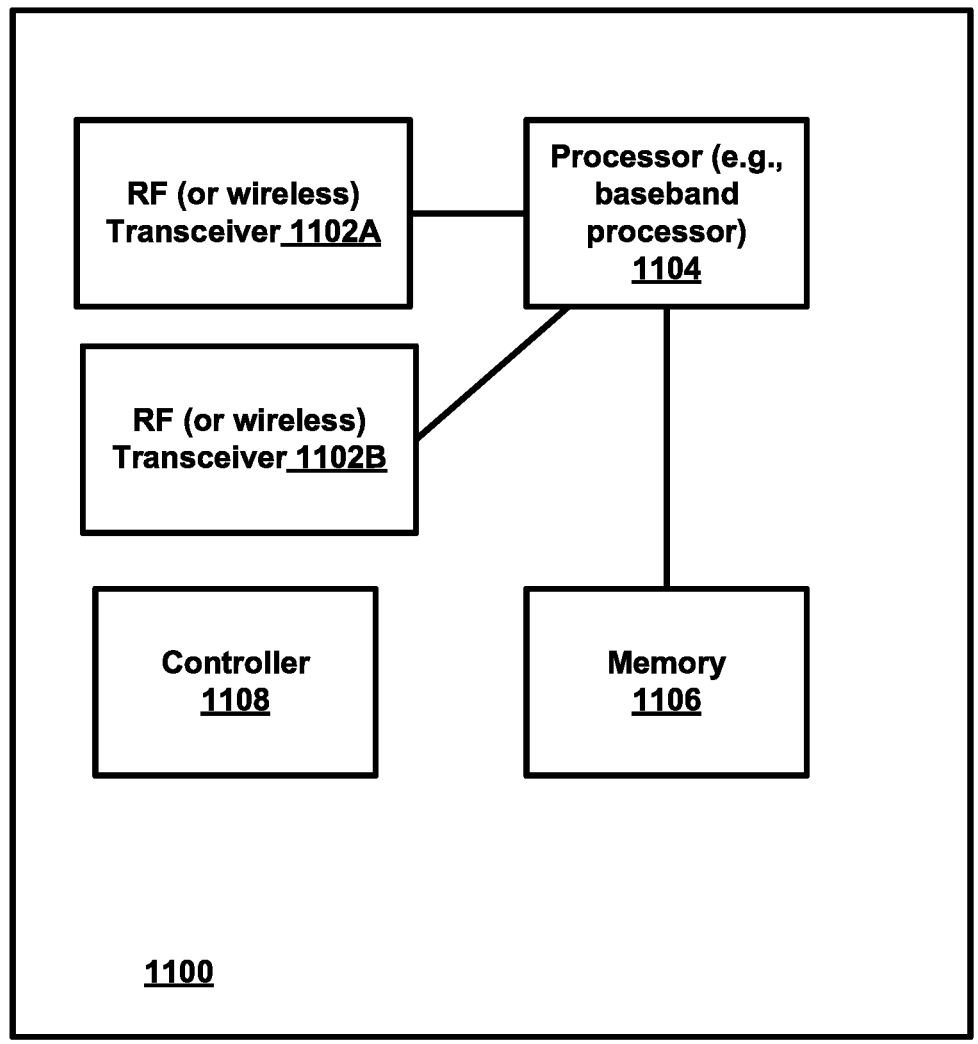
FIG. 7 is a block diagram of a wireless station or wireless node (e.g., AP, BS, gNB, RAN node, relay node, UE or user device, or other node) according to an example embodiment.

FIG. 7 is a block diagram of a wireless station or node (e.g., AP, BS, gNB, eNB, a relay node or other network node, or a user device/UE, or other node) 1100 according to an example embodiment. The wireless station 1100 may include, for example, one or more (e.g., two as shown in FIG. 7) RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 7, a controller (or processor) 1108 may execute software and instructions, and may provide overall control for the station 1100, and may provide control for other systems not shown in FIG. 7, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, via broadcast signalling with a user device from a network node of a wireless network, cell reselection-related information associated with each of a plurality of network slices or closed access groups used with the user device,
   wherein the cell reselection-related information is for use or adjustment, with one or more user devices, of a cell reselection criteria to cause the user device to perform cell reselection to a cell that supports a network slice that is used by the user device;
   based on the received cell reselection-related information, measuring with the user device a signal parameter of a signal for a cell that supports each of the plurality of network slices or closed access groups used with the user device;
   based on the measuring, performing, with the user device, a cell reselection based, at least in part, on the cell reselection-related information that is associated with each of the plurality of network slices or closed access groups used with the user device,
   identifying one or more network slices or closed access groups of the plurality of network slices or closed access groups used by the user device that are supported with at least one other cell, and
   based on the identifying, selecting a cell reselection-related information, among the received cell reselection-related information, that is associated with a network slice or closed access group used with the user device.

2. The method of claim 1, wherein the user device is a user device that is in an inactive state or idle state.

3. The method of claim 1 wherein the cell reselection-related information comprises at least one of the following:
   information identifying one or more network slices or closed access groups that are supported with each of one or more other cells;
   an indication that a frequency or frequency band supports each of the plurality of network slices or closed access groups used with the user device;
   an indication that a frequency or frequency band does not support at least one of the network slice or the closed access group used with the user device;
   an indication that one or more cells or a network node supports the network slice or is part of the closed access group used with the user device;
   an indication that a radio access technology supports at least one of the network slice or the closed access group used with the user device;
   a parameter that is part of a cell reselection criteria that favors or prioritizes, for cell reselection, a cell that supports at least one of the network slice or the closed access group used with the user device over a cell that does not support the network slice or the closed access group used with the user device;
   an offset, to be used with the user device as part of a cell reselection criteria, associated with the at least one of the network slice or the closed access group used with the user device;
   a network slice-specific reference signal received power offset or a reference signal received quality offset that is part of a cell reselection criteria;
   a closed access group-specific reference signal received power offset or a reference signal received quality offset that is part of a cell reselection criteria; or
   a slice-specific measurement rule or a closed access group specific measurement rule, specific to the at least one of the network slice or the closed access group used with the user device, that provides a rule or instructions for performing signal measurements as part of cell reselection.

4. The method of claim 1:
   wherein the receiving a cell reselection-related information comprises:
   receiving an offset associated with at least one of the network slice or the closed access group used with the user device; and
   wherein the performing cell reselection comprises:
   evaluating, with the user device, a cell reselection criteria based on at least the offset associated with at least one of the network slice or the closed access group used with the user device.

5. The method of claim 1 wherein the performing cell reselection comprises:
   measuring, with the user device, a signal parameter of a signal received from a non-serving cell;
   evaluating, with the user device, a cell reselection criteria based on at least the measured signal parameter and the cell reselection-related information associated with at least one of the network slice or the closed access group used with the user device;

determining, with the user device, that the cell reselection criteria is met for the non-serving cell; and
selecting, with the user device, the non-serving cell to camp on for which the cell reselection criteria is met.

6. The method of claim 1:
wherein the cell reselection-related information comprises a plurality of cell reselection-related information including:
an indication that a frequency band supports at least one of the network slice or the closed access group used with the user device, and
an offset associated with at least one of the network slice or the closed access group used with the user device and to be used for evaluating a cell reselection criteria;
wherein the performing cell reselection comprises:
measuring, with the user device, a signal parameter of a signal received from a cell via the frequency band that supports at least one of the network slice or the closed access group used with the user device; and
evaluating, with the user device, a cell reselection criteria for the cell based on at least the measured signal parameter of the cell and the offset.

7. The method of claim 1:
wherein the receiving a cell reselection-related information comprises:
receiving an indication that a frequency band supports at least one of the network slice or the closed access group used with the user device; and
wherein the performing cell reselection comprises:
measuring, with the user device, a signal parameter of signals received via the frequency band that is indicated as supporting at least one of the network slice or the closed access group that is used with the user device.

8. The method of claim 7, wherein the performing cell reselection further comprises:
evaluating, with the user device, a cell reselection criteria based on the measured signal parameter of the signals received via the frequency band.

9. A non-transitory computer-readable storage medium comprising instructions stored thereon that, when executed with at least one processor, are configured to cause an apparatus to perform the method of claim 1.

10. An apparatus comprising:
at least one processor; and
at least one memory storing instructions that, when executed with the at least one processor, cause the apparatus at least to perform:
receiving via broadcast signalling, with a user device from a network node of a wireless network, a cell reselection-related information associated with each of a plurality of network slices or closed access groups of a network slice or a closed access group used with the user device, where the user device comprises the apparatus; and
wherein the cell reselection-related information is for use or adjustment, with one or more user devices, of a cell reselection criteria to cause the user device to perform cell reselection to a cell that supports a network slice that is used by the user device;
based on the received cell reselection-related information, measuring with the user device a signal parameter of a signal for a cell that supports each of the plurality of network slices or closed access groups used with the user device; and
based on the measuring, performing, with the user device, a cell reselection based, at least in part, on the cell reselection-related information that is associated with each of the plurality of network slices or closed access groups used with the user device,
identifying one or more network slices or closed access groups of the plurality of network slices or closed access groups used by the user device that are supported with at least one other cell, and
based on the identifying, selecting a cell reselection-related information, among the received cell reselection-related information, that is associated with a network slice or closed access group used with the user device.

11. A method comprising:
sending via broadcast signalling, with a network node in a wireless network, a cell reselection-related information associated with each of at least one of a network slice or a closed access group each of a plurality of network slices or closed access groups
wherein the cell reselection-related information is for use or adjustment, with one or more user devices, of a cell reselection criteria to cause a user device to perform cell reselection to a cell that supports a network slice that is used by the user device;
based on the received cell reselection-related information, causing measuring with the user device a signal parameter of a signal for a cell that supports each of the plurality of network slices or closed access groups used with the user device; and
based on the measuring, causing performing, with the user device, a cell reselection based, at least in part, on the cell reselection-related information that is associated with each of the plurality of network slices or closed access groups used with the user device,
wherein one or more network slices or closed access groups of the plurality of network slices or closed access groups used are identified by the user device as supported with at least one other cell, and
wherein based on the identifying, the user device is caused to select cell reselection-related information, among the received cell reselection-related information, that is associated with a network slice or closed access group used with the user device.

12. The method of claim 11 wherein the sending comprises:
sending, with the network node, the cell reselection-related information via either a broadcast signalling or a dedicated signalling transmitted to a user device.

13. The method of claim 11, wherein the sending comprises:
sending, with the network node in the wireless network, the cell reselection-related information associated with the each of the at least one of a network slice or a closed access group used with a user device, wherein the cell reselection-related information is for use or adjustment, with one or more user devices, of a cell reselection criteria.

14. The method of claim 11, wherein the sending a cell reselection-related information comprises:
broadcasting, with the network node, system information including the cell reselection-related information associated with at least one of the network slice or the closed access group, wherein the cell reselection-related information is for use or adjustment of a cell reselection criteria.

15. The method of claim 11, wherein the sending a cell reselection-related information comprises:

sending, with the network node to at least a user device, information identifying one or more network slices or closed access groups that are supported with at least one other cell.

16. The method of claim 11, comprising:
receiving, with the network node from a user device, a request with the user device to use the network slice or the closed access group of one or more cells of the wireless network.

17. The method of claim 11, wherein the user device is a user device that is in an inactive state or idle state.

18. The method of claim 11 wherein the cell reselection-related information comprises at least one of the following:
information identifying one or more network slices or closed access groups that are supported with each of one or more other cells;
an indication that a frequency or frequency band supports at least one of the network slice or the closed access group;
an indication that a frequency or frequency band does not support at least one of the network slice or the closed access group;
an indication that one or more cells or a network node supports the network slice or is part of the closed access group;
an indication that a radio access technology supports at least one of the network slice or the closed access group;
a parameter that is part of a cell reselection criteria that favors or prioritizes, for cell reselection, a cell that supports at least one of the network slice or the closed access group used with the user device over a cell that does not support the network slice or the closed access group;
an offset, to be used with the user device as part of a cell reselection criteria, associated with at least one of the at least one of the network slice or the closed access group;
a network slice-specific reference signal received power offset or a reference signal received quality offset that is part of a cell reselection criteria;
a closed access group-specific reference signal received power offset or a reference signal received quality offset that is part of a cell reselection criteria; or
a network slice-specific measurement rule or a closed access group specific measurement rule, specific to the at least one of the network slice or the closed access group, that provides a rule or instructions for performing signal measurements as part of cell reselection.

19. The method of claim 11, wherein the sending a cell reselection-related information comprises:

sending, with the network node, an offset associated with at least one of the network slice or the closed access group, for adjustment of a cell reselection criteria for a cell that supports the network slice or the closed access group.

20. The method of claim 11, wherein the sending a cell reselection-related information comprises:
sending an indication that a frequency band supports at least one of the network slice or the closed access group.

21. A non-transitory computer-readable storage medium comprising instructions stored thereon that, when executed with at least one processor, are configured to cause an apparatus to perform the method of claim 11.

22. An apparatus comprising:
at least one processor; and
at least one memory storing instructions that, when executed with the at least one processor, cause the apparatus at least to perform:
sending via broadcast signalling, with a network node in a wireless network, a cell reselection-related information associated with each of at least one of a network slice or a closed access group, where the network node comprises the apparatus,
wherein the cell reselection-related information is for use or adjustment, with one or more user devices, of a cell reselection criteria to cause a user device to perform cell reselection to a cell that supports a network slice that is used by the user device;
based on the received cell reselection-related information, causing measuring with the user device a signal parameter of a signal for a cell that supports each of a plurality of network slices or closed access groups used with the user device; and
based on the measuring, causing performing, with the user device, a cell reselection based, at least in part, on the cell reselection-related information that is associated with each of the plurality of network slices or closed access groups used with the user device,
wherein one or more network slices or closed access groups of the plurality of network slices or closed access groups used are identified by the user device as supported with at least one other cell, and
wherein based on the identifying, the user device is caused to select cell reselection- related information, among the received cell reselection-related information, that is associated with a network slice or closed access group used with the user device.

* * * * *